Figures 1, 2:
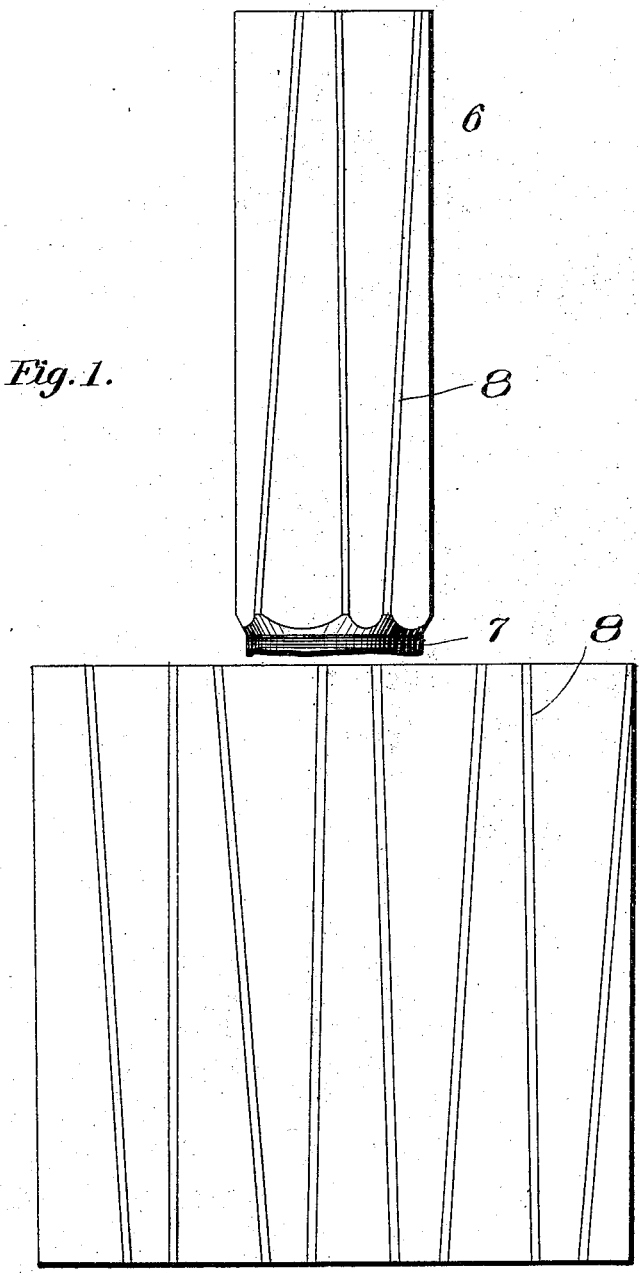

No. 725,374. PATENTED APR. 14, 1903.
J. SHAW.
REAMER.
APPLICATION FILED APR. 18, 1902.
NO MODEL.

WITNESSES:
E. F. Camp.
Geo. E. Tew

INVENTOR
John Shaw
BY
Milo B. Stevens & Co.
ATTORNEYS

UNITED STATES PATENT OFFICE.

JOHN SHAW, OF FRANKLIN, PENNSYLVANIA, ASSIGNOR OF TWO-THIRDS TO WILLIAM G. SHAW, OF CLEVELAND, OHIO, AND ARMIN GEORGE KRITCH, OF FRANKLIN, PENNSYLVANIA.

REAMER.

SPECIFICATION forming part of Letters Patent No. 725,374, dated April 14, 1903.

Application filed April 18, 1902. Serial No. 103,503. (No model.)

*To all whom it may concern:*

Be it known that I, JOHN SHAW, a citizen of the United States, residing at Franklin, in the county of Venango and State of Pennsylvania, have invented certain new and useful Improvements in Reamers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to reamers; and it consists in the novel and peculiar location and direction of the cutting-blades thereof with respect to the axis of the reamer and to each other.

The blades of the reamer are so disposed as to each present a different angle to the metal or material being bored; and the object of the invention is to form a reamer which will cut a clean and perfectly smooth hole, requiring little or no finishing. By the arrangement of the blades I get with each a shearing cut, which entirely avoids tearing or drawing the metal.

In the accompanying drawings, Figure 1 is a side elevation of the reamer; and Fig. 2 is a projection in plan of the face of the reamer, showing the angles of the cutting-blades.

Referring specifically to the drawings, the head of the reamer is indicated at 6 and the shank at 7. The cutters are indicated at 8, each of which extends at a different angle from the axial line of the reamer. Also the cutters are alternately inclined in opposite directions to the axis, so that a cutter which is inclined across the axis in one direction is followed in the cutting operation by a cutter which is inclined across the axis in the opposite direction. This gives a very effective and superior shearing cut by each cutter, and as each cutter is inclined at some angle to the axis there is no danger of drawing or tearing the metal incident to reamers having cutters which are parallel to the axis, and by inclining the cutters in alternately opposite directions a greater shearing angle is produced than with reamers having cutters all inclined in the same direction. As each cutter is inclined at a different angle from the axis, it follows that no two cutters are parallel.

The construction above indicated produces a reamer of superior utility with respect to quick action and smooth and perfect bore.

The reamer illustrated is provided with integral cutters; but the same invention may be employed in reamers having inserted blades, which latter, I believe, may be made somewhat cheaper than the former.

What I claim is—

1. A reamer the cutting-blades of which are alternately at opposite angles to the axial line of the reamer.

2. A reamer having cutting-blades part of which are inclined oppositely to the rest, with respect to the axis of the reamer.

3. A reamer the cutting-blades of which are each at a different angle from the axial line and from each other.

In testimony whereof I do affix my signature in presence of two witnesses.

JOHN SHAW.

Witnesses:
J. M. COLLINS,
WM. B. GRIFFEN.